(12) United States Patent
Lee et al.

(10) Patent No.: US 11,518,571 B2
(45) Date of Patent: Dec. 6, 2022

(54) DISPENSING HEAD AND DISPENSING DEVICE FOR THE METERED DISPENSING OF LIQUID PREPARATIONS, AND POSSIBLE USES

(71) Applicant: F. HOLZER GMBH, St. Ingbert (DE)

(72) Inventors: Hyeck-Hee Lee, St. Ingbert (DE); Ute Steinfeld, St. Ingbert (DE); Markus Mahler, Völklingen (DE); Frank Holzer, St. Ingbert (DE)

(73) Assignee: F. HOLZER GMBH, St. Ingbert (DE)

( * ) Notice: Subject to any disclaimer, the term of this patent is extended or adjusted under 35 U.S.C. 154(b) by 0 days.

(21) Appl. No.: 17/055,840

(22) PCT Filed: Apr. 1, 2019

(86) PCT No.: PCT/EP2019/058171
§ 371 (c)(1),
(2) Date: Nov. 16, 2020

(87) PCT Pub. No.: WO2019/223922
PCT Pub. Date: Nov. 28, 2019

(65) Prior Publication Data
US 2021/0197998 A1    Jul. 1, 2021

(30) Foreign Application Priority Data
May 23, 2018  (DE) .................. 10 2018 208 110.7

(51) Int. Cl.
*B65D 1/08* (2006.01)
*B05B 11/00* (2006.01)
(Continued)

(52) U.S. Cl.
CPC .............. *B65D 1/08* (2013.01); *B05B 11/007* (2013.01); *B05B 11/0067* (2013.01);
(Continued)

(58) Field of Classification Search
USPC ........................................................ 222/420
See application file for complete search history.

(56) References Cited

U.S. PATENT DOCUMENTS 2,761,591 A * 9/1956 Du Bois ................ B65D 35/40
222/335
6,491,176 B1  12/2002 Schollenberger et al.
(Continued)

FOREIGN PATENT DOCUMENTS

DE   29714031 U1   10/1997
DE   20209615 U1   7/2003
(Continued)

OTHER PUBLICATIONS

U.S. Appl. No. 10/570,004, filed Feb. 28, 2006.
(Continued)

*Primary Examiner* — Paul R Durand
*Assistant Examiner* — Michael J. Melaragno
(74) *Attorney, Agent, or Firm* — Leydig, Voit & Mayer, Ltd.

(57) ABSTRACT

The present invention relates to a dispensing head (1) for a dispensing device, and to a dispensing device (100) for the metered dispensing of liquid preparations, which dispensing device is provided with the dispensing head. The dispensing head comprises a special valve (6), which comprises at least one sealing lip (7*a*, 7*b*), by means of which a passage channel (3) for dispensing the liquid preparation, which passage channel is formed in the dispensing head, can be closed. The present invention is characterized by the simplicity of the dispensing head (1) and the economic advantages in the manufacturing which are linked to this simplicity.

15 Claims, 4 Drawing Sheets

(51) Int. Cl.
*B05B 11/04* (2006.01)
*B65D 1/32* (2006.01)
*B65D 47/20* (2006.01)
*G01F 11/08* (2006.01)

(52) U.S. Cl.
CPC .......... *B05B 11/047* (2013.01); *B05B 11/048* (2013.01); *B65D 1/32* (2013.01); *B65D 47/2018* (2013.01); *G01F 11/082* (2013.01)

(56) References Cited

U.S. PATENT DOCUMENTS

| | | | | |
|---|---|---|---|---|
| 8,550,300 | B2* | 10/2013 | Lee ..................... | B05B 11/3074 222/95 |
| 2005/0139620 | A1 | 6/2005 | Heukamp | |
| 2007/0257063 | A1* | 11/2007 | Schliemann ........ | B05B 11/0067 222/207 |
| 2008/0035677 | A1* | 2/2008 | Daansen ............ | B65D 47/2031 222/310 |
| 2010/0252581 | A1* | 10/2010 | Greiner-Perth ..... | B05B 11/0067 222/320 |
| 2011/0056993 | A1* | 3/2011 | Lee ..................... | B05B 11/3022 222/256 |
| 2013/0043273 | A1* | 2/2013 | Lee ..................... | B05B 11/3074 222/82 |
| 2013/0200110 | A1* | 8/2013 | Lee ..................... | B05B 11/3069 222/321.6 |
| 2014/0287012 | A1 | 9/2014 | Lee et al. | |
| 2014/0301875 | A1* | 10/2014 | Lee ..................... | B05B 11/305 417/534 |
| 2015/0045747 | A1* | 2/2015 | Anderson ............ | A61M 31/00 604/247 |
| 2015/0139973 | A1 | 5/2015 | Steinfeld et al. | |
| 2015/0144127 | A1* | 5/2015 | Ekman ............... | A61M 15/0028 128/200.14 |
| 2016/0244222 | A1* | 8/2016 | Sterling ............... | G01F 11/30 |
| 2017/0291183 | A1* | 10/2017 | Lee ..................... | B05B 11/305 |
| 2017/0336234 | A1* | 11/2017 | Pater ................... | G01F 11/263 |
| 2018/0044162 | A1* | 2/2018 | Scott ................... | B65B 3/06 |
| 2019/0101108 | A1* | 4/2019 | Lee ..................... | B05B 11/305 |
| 2019/0212179 | A1* | 7/2019 | Lee ..................... | G01F 15/005 |
| 2019/0224705 | A1* | 7/2019 | Lee ..................... | B05B 11/007 |

FOREIGN PATENT DOCUMENTS

EP 1 213 003 A1 6/2002
WO WO 2018/010889 A1 1/2018

OTHER PUBLICATIONS

U.S. Appl. No. 13/395,368, filed Mar. 9, 2012.
U.S. Appl. No. 14/118,503, filed Nov. 18, 2013.
U.S. Appl. No. 14/401,464, filed Nov. 14, 2014.
European Patent Office, International Search Report in International Application No. PCT/EP2019/058171 (dated Jun. 4, 2019).
European Patent Office, Written Opinion in International Application No. PCT/EP2019/058171 (dated Jun. 4, 2019).
International Bureau of WIPO, International Preliminary Report on Patentability in International Application No. PCT/EP2019/058171 (dated Nov. 24, 2020).

* cited by examiner

DISPENSING HEAD AND DISPENSING DEVICE FOR THE METERED DISPENSING OF LIQUID PREPARATIONS, AND POSSIBLE USES

CROSS-REFERENCE TO RELATED APPLICATIONS

This patent application is the U.S. national phase of International Application No. PCT/EP2019/058171, filed on Apr. 1, 2019, which claims the benefit of German Patent Application No. 10 2018 208 110.7, filed May 23, 2018, the disclosures of which are incorporated herein by reference in their entireties for all purposes.

The present invention relates to a dispensing head for a dispensing device and to a dispensing device provided with the dispensing head for the metered dispensing of liquid preparations. The dispensing head here comprises a special valve that comprises at least one sealing lip by which a passage channel introduced in the dispensing head to dispense the liquid preparation can be closed. The present invention is characterized here by the simplicity of the dispensing head and by the economic advantages in the manufacture associated therewith.

WO 2018/010889 relates to a pump head that enables a metered dispensing of fluids and a metering device that can, for example, be configured as a squeeze bottle, with the metering device comprising a correspondingly configured pump head. The pump head described there is, however, not sufficiently pressure sensitive so that the targeted metered dispensing of a specific volume of a fluid to be metered is made more difficult.

It is the object of the present invention to provide a dispensing head for a dispensing device for the metered dispensing of liquid preparations or to provide a corresponding dispensing device that is as pressure sensitive as possible and thus facilitates the dispensing of an exactly metered quantity of a fluid to be dispensed—in particular liquids having low surface tension such as aqueous solutions. The dispensing head should additionally have a valve that has a design that is as simple as possible. This object is achieved by the features of the dispensing head and the dispensing device described herein and the advantageous developments thereof. Uses of the dispensing device according to the invention are also described.

The present invention thus relates to a dispensing head for a dispensing device for the metered dispensing of liquid preparations comprising a passage channel that has an inlet opening arranged at the inner side and an outer dispensing opening for liquid preparations, wherein the inlet opening connects an inner space to an outer environment via the passage channel and a valve comprising a valve body that is arranged on the side of the inner space above the inlet opening and the inlet opening is designed as reversibly sealingly closable with respect to an inner space for the liquid preparation, wherein the valve body has at least one sealing lip that is formed on a side of the valve body facing the inlet opening and seals the inner space with respect to the inlet opening when the valve body closes the inlet opening.

The dispensing head thus has a passage channel by which liquid preparation to be dispenses can be dispensed from an inner side (on which the valve is arranged) to the outer side. The dispensing head for this purpose comprises a passage channel that has an inlet opening arranged on the inner side and an outer dispensing opening. The valve is configured here such that it can independently close the inlet opening of the passage channel (and thus the complete passage channel) in some operating states of the dispensing head.

In accordance with the invention, the valve body has at least one sealing lip by which it is made possible to effectively close the inlet opening of the passage channel. The valve body itself is here formed as movable with respect to the inlet opening so that it is possible in an open state of the valve that liquid preparation to be metered can be dispensed into the inlet opening and thus into the passage channel and to the outside via the dispensing opening.

The valve in accordance with the invention thus makes it possible that the fluid to be dispensed can pass between the dispensing head and the at least one sealing lip or the plurality of sealing lips in the event that the valve body is not pressed at all or is pressed with a sufficiently small pressing force by the fluid to be dispensed to the inlet opening of the passage channel. For the case that the pressure on the valve body is increased (for example via the fluid to be dispensed) or for the exemplary case that a pressure increase occurs, the valve body having the at least one sealing lip arranged thereon is pressed sufficiently forcefully onto the dispensing head and thus reliably closes the inlet opening of the passage channel. The passage channel is closed by the valve in this operating state.

The valve is thus open when no pressure is applied to the squeeze bottle; there is then a narrow gap between the at least one sealing lip of the valve body and the wall of the dispensing head. The gap here, however, has such small dimensions that no fluid can exit, even if the metering device having the dispensing head in accordance with the invention is positioned with the outlet opening facing downward (e.g. during transport or storage of the metering device in a corresponding position such as in a handbag or in a trouser pocket). This is due to the surface tension of the fluid and to the small distance between the valve and the wall of the dispensing head. The dispensing of the fluid to be metered takes place by exerting a pressure on the fluid present in the interior of the metering device, for example in that pressure is exerted on a squeeze bottle. The dispensing of the fluid takes place here in a metered manner until a closure of the valve takes place. The valve is closed by pressure on the squeeze bottle and after dispensing the defined metered volume in that a fluidic closure of the outlet passage takes place even if the pressure continues.

When the metering device is stored facing downward (i.e. when the valve is arranged above the passage channel), the fluid to be metered can flow into the passage channel due to the fact that the valve is open. On an actuation of the metering device (i.e. for the case that pressure is exerted on the stored fluid in that e.g. a squeeze bottle is pressed), a metered dispensing of the fluid then takes place through the valve until the closure of the passage channel. The metered quantity is thus defined by a metering stroke of the valve.

If there is air between the valve and the liquid, that is e.g. when storing the metering device facing upward (i.e. when the valve is arranged below the passage channel), only air is present in the passage channel since the liquid flows back into the storage container due to gravity. Only a stroke quantity of air thus exits on an exertion of pressure.

The present invention is in particular characterized by the simplicity of the valve that can, for example, be formed in one piece and that can be placed into the dispensing head. In this respect, no further fastening means for the valve are required; both the dispensing head and the valve can equally be produced from a single material so that foreign materials such as metals or complex mechanical constructions become superfluous.

In accordance with a preferred embodiment, the valve body comprises at least two sealing lips, an inner sealing lip, and an outer sealing lip.

It is further preferred that the at least one sealing lip, in particular the inner sealing lip and the outer sealing lip, is/are arranged concentrically at the valve body. Due to the concentric design, the inlet opening, that can equally be formed as circular in cross-section, for the passage channel (optionally likewise equally circular), can, for example, be reliably surrounded and thus sealed with respect to the inner space.

It is in particular advantageous for the manufacture of the valve if the valve body and the at least one sealing lip are formed in one piece.

It is further preferred if the at least one sealing lip has a height in the direction of the inlet opening of 0.05 to 1 mm, preferably 0.1 to 0.5 mm.

The at least one sealing lip (7a, 7b) can, for example, have a width of 0.05 to 1 mm, preferably 0.1 to 0.4 mm.

It is further preferred if the at least one sealing lip is formed from a thermoplastic or elastomeric plastic, in particular from a polyolefin such as polyethylene, polypropylene, polystyrene, or a polyamide such as PA6, PA66, PA12.

It is equally possible that the valve comprises a frame that has at least one fastening element to which the valve body is fixed, with the frame being fastened to the dispensing head.

It is in particular of advantage here if the valve body, the frame, and the at least one fastening element are formed in one piece.

It is further preferred in the previously named embodiment if the dispensing head has a cutout into which the frame with the valve body is fitted in a force transmitting or shape matched manner.

A further preferred embodiment provides that the valve is loosely received in a cutout of the dispensing head and is formed as vertically movable in the cutout.

It is in particular of advantage in the previously named embodiment if the valve body is dimensioned such that the liquid preparation can flow between the valve body and a wall bounding the cutout.

It is in particular preferred for the case that the valve body is loosely placed into the cutout to secure the valve or the valve body. Provision is made in accordance with this preferred embodiment that the cutout has a boundary that prevents a complete vertical leading of the valve out of the cutout.

It is further preferred that the valve body has a guide prolongation that engages into the passage channel and that has a smaller cross-section than the passage channel.

It can in particular be of advantage here if the guide prolongation and the valve body are formed in one piece.

The present invention additionally relates to a dispensing device for the metered dispensing of liquid preparations comprising a dispensing head in accordance with the present invention, and a flexible storage container, with the dispensing head being installed on the storage container in a fluidically sealed manner.

The storage container is here in particular formed as a squeeze bottle that can be actuated by pressure.

The storage container can here be selected from a material selected from the group comprising thermoplastics and elastomeric plastics, in particular from a polyolefin such as polyethylene, polypropylene, polystyrene, or a polyamide such as PA6, PA66, PA12.

The invention further relates to the use of a previously named dispensing device in accordance with the invention.

The use possibilities are here, in accordance with the invention, the storage and/or metered dispensing of ophthalmic products, in particular eye drops; rhinological products, in particular nose drops; fluids, gels, creams, pastes, foods, and food supplements.

BRIEF DESCRIPTION OF THE DRAWINGS

The present invention was illustrated in more detail with reference to the following Figures and examples without restricting the invention to the shown specific circumstances.

There are shown.

DETAILED DESCRIPTION OF THE INVENTION

Figure 1:
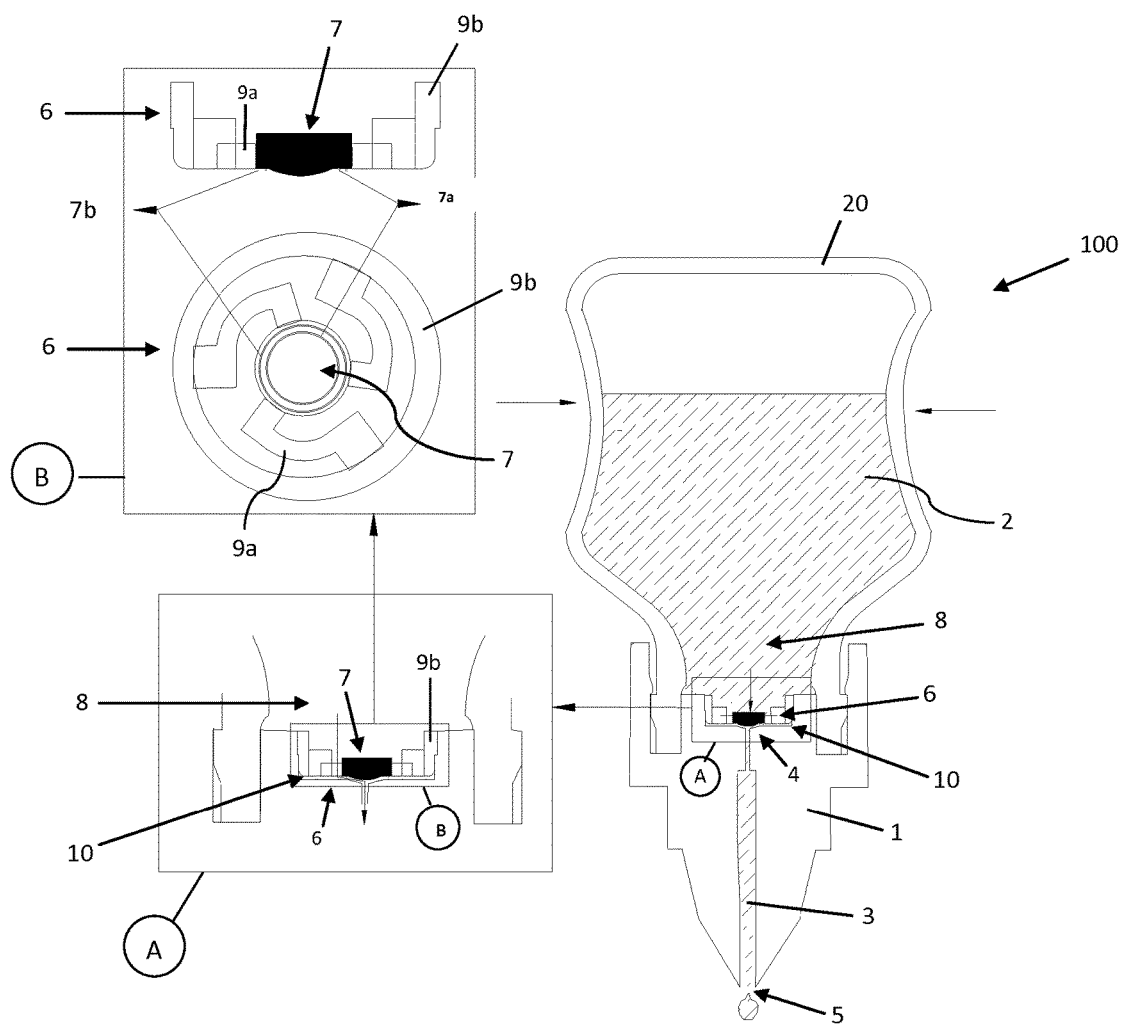
FIG. 1: a first embodiment in accordance with the invention of a dispensing head and of a dispensing device in an opened state.

FIG. 1 shows a first embodiment of a dispensing device 100 in accordance with the present invention that comprises a dispensing head 1 in accordance with the invention. The entire dispensing device 100 is shown at the right in FIG. 1 in the state in which a metered dispensing of a fluid 2 stored in a storage container 20 takes place. The storage container 20 is here connected to a dispensing head 1 in accordance with the invention, for example via a snap-closure or another mechanical fastening. The dispensing head here has a dispensing opening 5 via which the liquid preparation 2 can be dispensed. The dispensing opening 5 communicates via a passage channel 3 with the inlet opening 4 via which liquid preparation 2 can move from an inner space 8 via the passage channel 3 in the direction of the dispensing opening 5.

The storage vessel 20 is here in particular formed as a squeeze bottle that can be squeezed and thus actuated by pressure (see the arrows shown at the right in FIG. 1).

The valve 6 that can reversibly close the inlet opening 4 of the passage channel 3 is shown in a detailed embodiment in section A (bottom left of FIG. 1). A further enlarged representation of the valve 6 can be seen in section B that selectively shows the valve 6 in a lateral sectional drawing (section B, top) and in a perspective plan view (section B, bottom).

The valve 6 here has a valve body 7 that has two concentric sealing lips 7a, 7b at its lower side (i.e. at the side facing the inlet opening 4 of the passage channel 3). The metered volume is first dispensed at a high pressure. After dispensing the defined volume, the valve 6 is then closed by the increasing pressure. The valve body 7 is pressed onto the inlet opening 4 of the passage channel 3, in particular via the sealing lips 7a, 7b, due to the pressure exerted on the squeeze bottle and a fluidic closure takes place in which a barrier that is temporarily impenetrable for the fluid 2 is formed between the wall of the dispensing head 1 to which the valve body 7 is pressed and the inlet opening 4 of the passage channel 3. This is unlike conventional squeeze bottle in which no metered dispensing takes place, but rather the dispensing is only stopped when the pressure on the squeeze bottle is ended. The dispensing volume can thus be metered independently of the pressure exerted on the squeeze bottle and thus always equally.

In the exemplary case of FIG. 1, the valve 6 is configured here such that the valve body 7 (with the sealing lips 7a, 7b located thereon) is fastened to a frame 9b via holding arms 9a. All the previously named components form the valve 6. This valve 6 can be inserted into a reception opening 10 in the dispensing head 1 provided for the reception of this valve 6 and can be fastened therein (for example, only via a corresponding dimensional design of the reception opening 10 in the dispensing head and of the valve 6) without it being necessary to use additional mechanical means to fasten the valve 6 in the dispensing head 1.

Figure 2A:
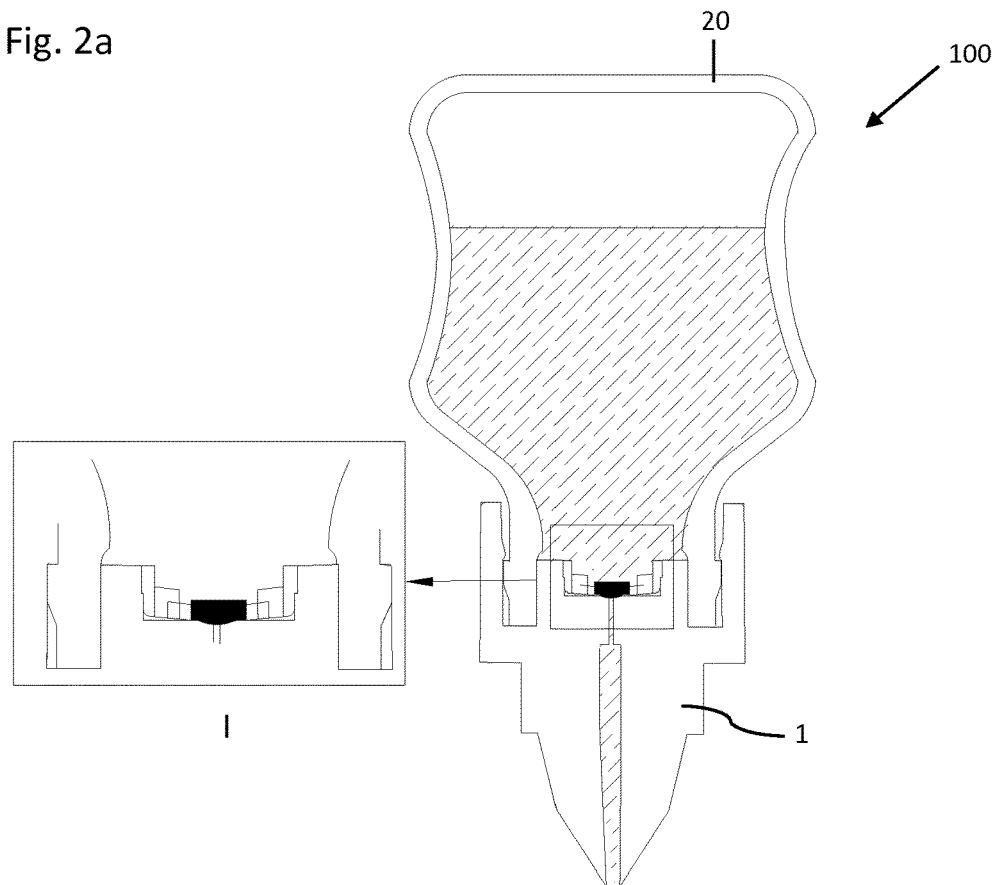
FIG. 2a: the dispensing device in accordance with the first embodiment—after the completed dispensing of the metered volume and thus the closure of the valve.

The dispensing device 100 is shown in FIG. 2a as also already shown in FIG. 1. For reasons of clarity, all the reference symbols of the components that are the same per se are not listed in FIG. 2. The state is shown in detail I in which the valve body 7 is completely pressed onto the inlet opening 4 of the passage channel 3 and the passage channel 3 is thus closed by the valve body 7.

Figure 2B:
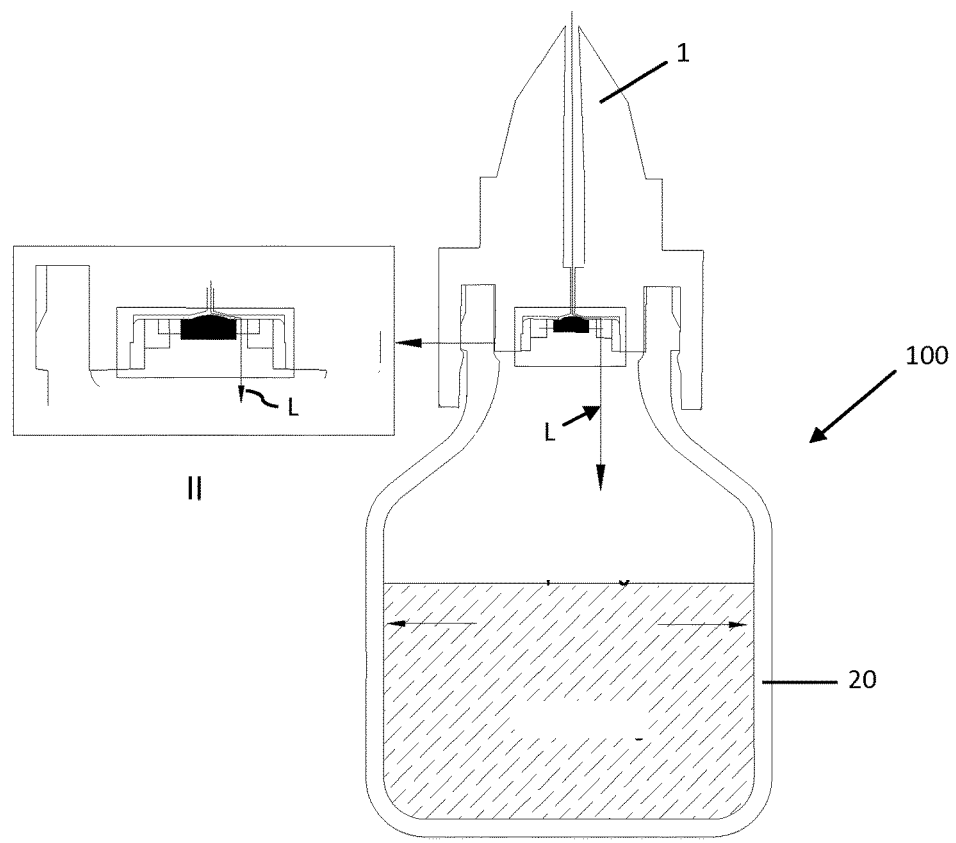
FIG. 2b: the dispensing device in accordance with the first embodiment in the equalized pressure state, i.e. on the equalization of the suction power in the squeeze bottle by air inflow.

FIG. 2b shows the state of pressure equalization, i.e. when the dispensing device 100 is set into a storage state after a dispensing has taken place. The dispensing device is here placed onto the base of the storage container 20. A reversible expansion of the squeeze bottle 20 takes place; volume previously dispensed in the form of liquid 2 is replaced with air here (shown in detail II) that can flow into the inner space 8 via the passage channel 3. A pressure equalization thus takes place in the interior by the sucking in of air. The position in which the squeeze bottle is located plays no role here.

Figure 3:
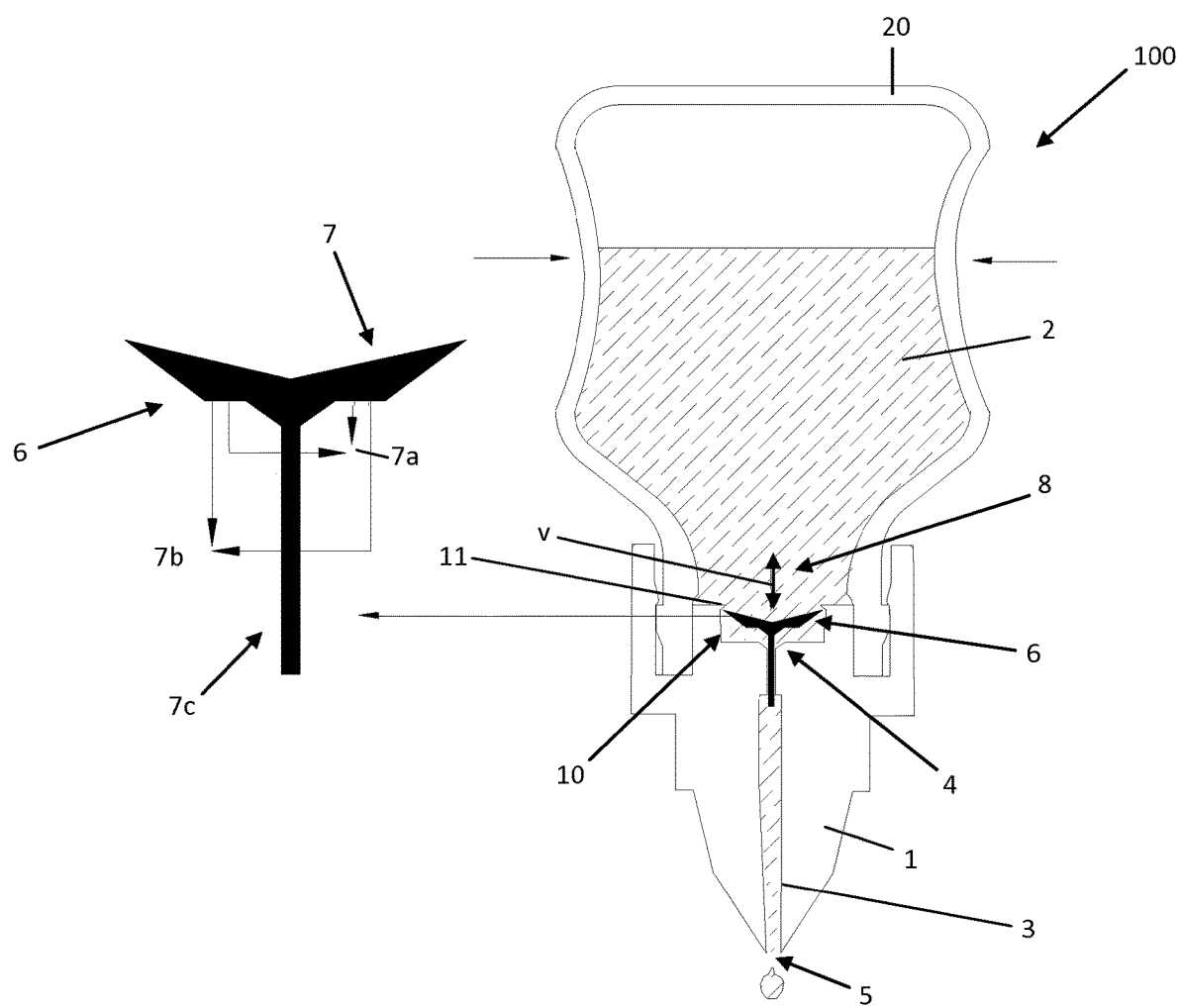
FIG. 3: a second embodiment in accordance with the invention of a dispensing device in an opened state.

FIG. 3 shows an alternative embodiment of a dispensing head 1 in accordance with the invention having an alternative valve 6. In the case of FIG. 3, the valve 6 has a valve body 7 at which—otherwise analogously to the valve 6 in accordance with FIG. 1—two sealing lips 7a and 7b are arranged at the lower side. The valve body 7 additionally has a guide prolongation 7c. The valve 6 is here received in a reception opening 10 of the dispensing head 1 and is vertically movable there (indicated to the arrows by the arrow v). The reception opening 10 has a boundary 11 that can, for example, be configured in the form of a projection and/or of a constriction of the opening 10 to prevent the valve 6 from falling out of the reception opening 10 in the operating state or in the state in which the metering device is placed upside down on the base of the squeeze bottle 20.

The valve body 7 is dimensioned here such that fluid 2 can flow in the direction of the inlet opening 4 or the passage channel 3 between the wall of the reception opening 10 and the tips of the valve body 7 at any time.

The guide prolongation 7c shown in the exemplary case of FIG. 3 is configured here in a manner to secure the valve 6 in a horizontal position with respect to the passage channel 3 or the inlet opening 4 so that a reliable sealing of the inlet opening 4 is always ensured via the sealing lips 7a, 7b.

The function of the valve 6, in particular as regards the pressures for the reversible closing of the inlet opening 4, is identical to the embodiment of FIG. 1 in all the other respects.

Figure 4A:
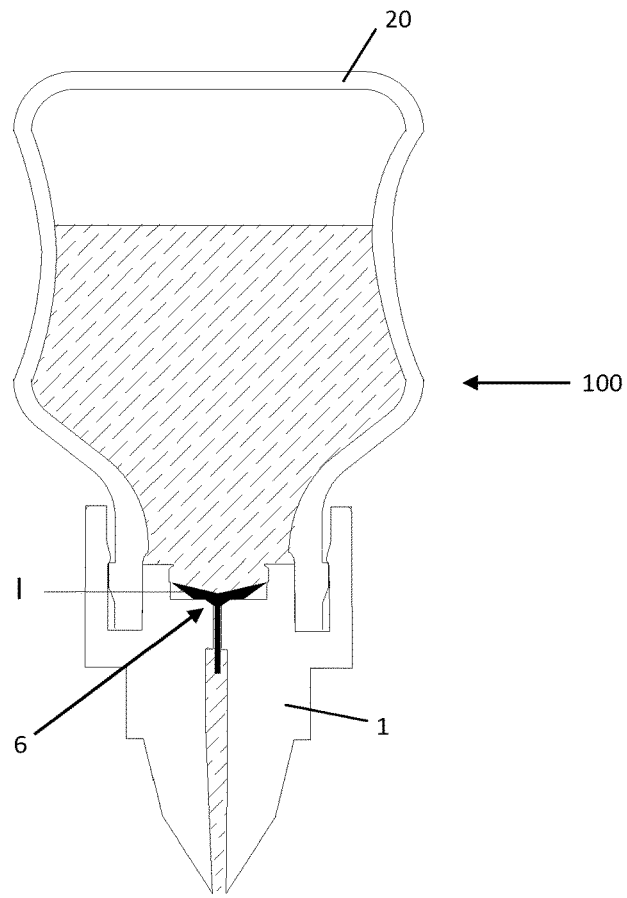
FIG. 4a: the dispensing device in accordance with the second embodiment after the completed dispensing of the metered volume and thus the closure of the valve.

FIG. 4a shows the dispensing device 100—in an analog manner to FIG. 2a—in a state I in which the inlet opening 4 of the passage channel 3 is completely closed via the valve 6. This state occurs when pressures are exerted on the squeeze bottle 20 reaching to the rear.

Figure 4B:
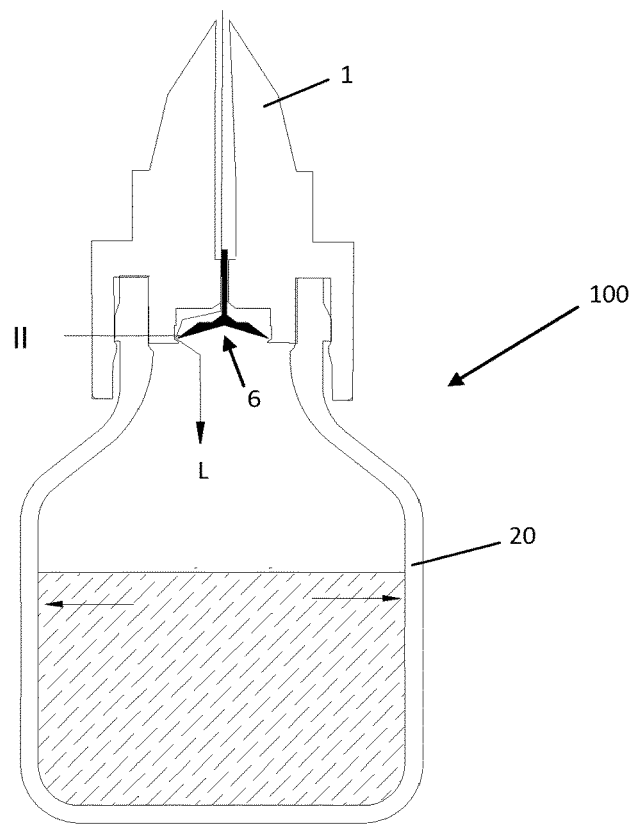
FIG. 4b: the dispensing device in accordance with the second embodiment in the equalized pressure state, i.e. on the equalization of the suction power in the squeeze bottle by air inflow.

FIG. 4b shows the dispensing device 100 in a state II in which previously dispensed volume of the liquid preparation 2 is replaced with air L and the squeeze bottle 20 returns to the original state (see indicated arrows).

The invention claimed is:

1. A dispensing head for a dispensing device for metered dispensing of a liquid preparation comprising:
    a passage channel that has an inlet opening arranged at an inner side and an outer dispensing opening for the liquid preparation, wherein the inlet opening connects an inner space to an outer environment via the passage channel; and
    a valve comprising a valve body that is arranged on the side of the inner space above the inlet opening and the inlet opening is configured as reversibly sealingly closable for the liquid preparation with respect to an inner space;
    wherein the valve body comprises at least two sealing lips which are one inner sealing lip and one outer sealing lip and wherein the at least two sealing lips are arranged concentrically at the valve body;
    wherein the at least two sealing lips are formed on a side of the valve body facing the inlet opening and seal the inner space with respect to the inlet opening when the valve body closes the inlet opening;
    wherein the valve comprises a frame that has at least one fastening element to which the valve body is fixed, with the frame being fastened to the dispensing head; and
    wherein the valve body, the frame, and the at least one fastening element are formed in one piece, such that when the pressure on the valve body is increased the valve body closes the inlet opening of the passage channel.

2. The dispensing head in accordance with claim 1, wherein the valve body and the at least two sealing lips are formed in one piece.

3. The dispensing head in accordance with claim 1, wherein the at least two sealing lips have a height in the direction of the inlet opening of 0.05 to 1 mm.

4. The dispensing head in accordance with claim 1, wherein the at least two sealing lips have a width of 0.05 to 1 mm.

5. The dispensing head in accordance with claim 1, wherein the valve body and the at least two sealing lips are formed from a thermoplastic or elastomeric plastic.

6. The dispensing head in accordance with claim 1, wherein the dispensing head has a cutout into which the frame with the valve body is fitted in a force transmitting or shape matched manner.

7. The dispensing head in accordance with claim 1, wherein the valve is loosely received in a cutout of the dispensing head and is formed as vertically movable in the cutout.

8. The dispensing head in accordance with claim 7, wherein the valve body is dimensioned such that the liquid preparation can flow between the valve body and a wall bounding the cutout.

9. The dispensing head in accordance with claim 7, wherein the cutout has a boundary that prevents a complete vertical leading of the valve out of the cutout.

10. The dispensing head in accordance with claim 1, wherein the valve body has a guide prolongation that engages into the passage channel and that has a smaller cross-section than the passage channel.

11. The dispensing head in accordance with claim 10, wherein the guide prolongation and the valve body are formed in one piece.

12. A dispensing device for metered dispensing of liquid preparations comprising a dispensing head in accordance with claim 1 and a flexible storage container;
   wherein the dispensing head is installed on the storage container in a fluidically sealing manner.

13. The dispensing device in accordance with claim 12, wherein the flexible storage container is a squeeze bottle that can be actuated by pressure.

14. The dispensing device in accordance with claim 12, wherein the storage container is formed from a material selected from the group consisting of thermoplastics and elastomeric plastics.

15. The dispensing device in accordance with claim 12, wherein the storage container is formed from a polyolefin or a polyamide.

* * * * *